United States Patent [19]

Aoyama et al.

[11] Patent Number: 4,757,444
[45] Date of Patent: Jul. 12, 1988

[54] VECTOR PROCESSOR CAPABLE OF PERFORMING ITERATIVE PROCESSING

[75] Inventors: Tomoo Aoyama; Yuuji Aoki; Hiroshi Murayama, all of Hadano, Japan

[73] Assignee: Hitachi, Ltd., Tokyo, Japan

[21] Appl. No.: 685,134

[22] Filed: Dec. 21, 1984

[30] Foreign Application Priority Data

Dec. 26, 1983 [JP] Japan .................................. 58-244042

[51] Int. Cl.$^4$ .................. G06F 15/347; G06F 9/38
[52] U.S. Cl. .................................. 364/200; 364/730; 364/736
[58] Field of Search ... 364/200 MS File, 900 MS File, 364/736, 730

[56] References Cited

U.S. PATENT DOCUMENTS

| | | | |
|---|---|---|---|
| 4,128,880 | 12/1978 | Cray, Jr. ......................... | 364/200 |
| 4,270,181 | 5/1981 | Tanakura et al. ................ | 364/736 |
| 4,302,818 | 11/1981 | Niemann ......................... | 364/736 |
| 4,400,768 | 8/1983 | Tomlinson ...................... | 364/200 |
| 4,435,765 | 3/1984 | Uchida et al. ................... | 364/200 |
| 4,507,728 | 3/1985 | Sakamoto et al. ............... | 364/200 |
| 4,525,796 | 6/1985 | Omoda et al. .................. | 364/730 |

*Primary Examiner*—Gareth D. Shaw
*Assistant Examiner*—Christina M. Eakman
*Attorney, Agent, or Firm*—Antonelli, Terry & Wands

[57] ABSTRACT

There is provided a vector processor based on a pipeline control method in which a cyclic operation is divided into a plurality of stages and processed. This processor comprises a vector register controller for dividing an operating process into a plurality of fundamental process units and controlling these units, and a phase generator for allowing the vector register controller to time-sharingly make the vector processor operative. This vector processor reads out data from vector registers in which vector elements are stored, operates this data and writes the result of operation into the vector register. With this vector processor, a cyclic operation can be processed in parallel at a high speed without causing a remarkable increase in hardware.

2 Claims, 8 Drawing Sheets

| CLOCK | INPUT OPERAND | | OUTPUT | PHASE |
|---|---|---|---|---|
| | FIRST | SECOND | | |
| 0 | $a_0$ | $a_1$ | $a_0 + a_1$ | P |
| 1 | $a_1$ | $a_2$ | $a_1 + a_2$ | |
| 2 | | | | N |
| 3 | | | | |
| 4 | $a_2$ | $a_3$ | $a_2 + a_3$ | P |
| 5 | $a_3$ | $a_4$ | $a_3 + a_4$ | |
| 6 | $x_0$ | $a_0 + a_1$ | $x_2$ | E |
| 7 | $x_1$ | $a_1 + a_2$ | $x_3$ | |
| $\ell+1$ | | | | N |
| $\ell+2$ | | | | |
| $\ell+3$ | $x_{\ell-3}$ | $a_{\ell-3} - a_{\ell-2}$ | $x_{\ell-1}$ | E |
| $\ell+4$ | $x_{\ell-2}$ | $a_{\ell-2} - a_{\ell-1}$ | $x_\ell$ | |

REPEAT (clocks 4–7)

VECTOR PROCESSOR CAPABLE OF PERFORMING ITERATIVE PROCESSING

BACKGROUND OF THE INVENTION

The present invention relates to a vector processor and, more particularly, to a vector processor for processing cyclic operation at a high speed.

Recent vector processors adopt the pipeline control method and due to this control, the operation process is divided into conceptual data processing steps referred to as stages and data which should be operated on is inputted to the processor without interruption, thereby realizing a high operating speed. A necessary and sufficient condition for performing high speed processing through the pipelined control is that there is no dependency in operations among the data elements which are used for operation and this is referred to as an "independent" relation.

On the other hand, as shown in the following equation $$x_{i+1} = x_i + a_i (i = 0, 1, 2, \ldots) \ldots \quad (1),$$

the cyclic operation or iteration requires a previous result of calculation, so that the "independent" relation is not satisfied. Thus, the data which should be operated on cannot be inputted to the vector processor without interruption and after the output from the processor was generated, this output has to be inputted again to the vector processor. Therefore, control should be made to interrupt the input of the to-be-operated data by clock timings over a number of stages of the vector processor. In the latest super high speed computer, the drop of processing capability of the vector processor with respect to the cyclic operation due to such interruption has decreased to at least a factor of several to a factor of tens as compared with the processing capability compared to other operation of the type which can be "independently" executed. This remarkable deterioration in performance is not limited to only the cyclic operation. In a method of raising the operating speed of the continuous operation processes by conceptually coupling the inputs and outputs of a plurality of vector operations due to the chaining control of the vector processor, such deterioration causes a drawback in that it results in deterioration in performance of the whole subsequent operation process of the cyclic operation.

SUMMARY OF THE INVENTION

It is an object of the present invention to provide a vector processor which can process a cyclic operation at a high speed without causing a remarkable increase in the amount of hardware.

A feature of the cyclic operation is "to perform the processes using a previous result"; however, this does not mean the result of one operation before. From the general equation of the cyclic operation $$x_{i+1} = f(x_i)$$

[where, $f(x_i)$ denotes a function of a variable $x_i$], the following modification of the equation is performed.

$$x_{i+1} = f(f(x_{i-1})) = g(x_{i-1})$$

Thus, "a previous result" means the result of two operations before. By repeating the modifying operations of this equation, the following relational equation will be obtained to an arbitrary positive number n.

$$x_{i+1} = f(f(\ldots f(x_{i-n}))) = h(x_{i-n})$$

This equation satisfies the following relation with respect to all values of m ($0 \leq m \leq n$).

$$x_{i+1+m} = h(x_{i-n+m})$$

Therefore, the n+1 results of $x_{n+1}, x_{n+2}, \ldots, x_{n+m+1}, \ldots, x_{n+1}$ can be obtained in parallel from $x_0, x_1, \ldots, x_m, \ldots, x_n$ (initial values). According to this method, n+1 arithmetic logic units are needed to perform the cyclic operation. Further, the function h which leads from the function f ordinarily becomes more complicated than the function f. Thus, the number of arithmetic logic units required to calculate $h(x_{i-n+m})$ from a variable $x_{i-n+m}$ is generally larger than that in the case of calculating the function f. For these reasons, the parallel processing method of the cyclic operation inevitably causes a remarkable increase in the amount of hardware.

Figure 1:
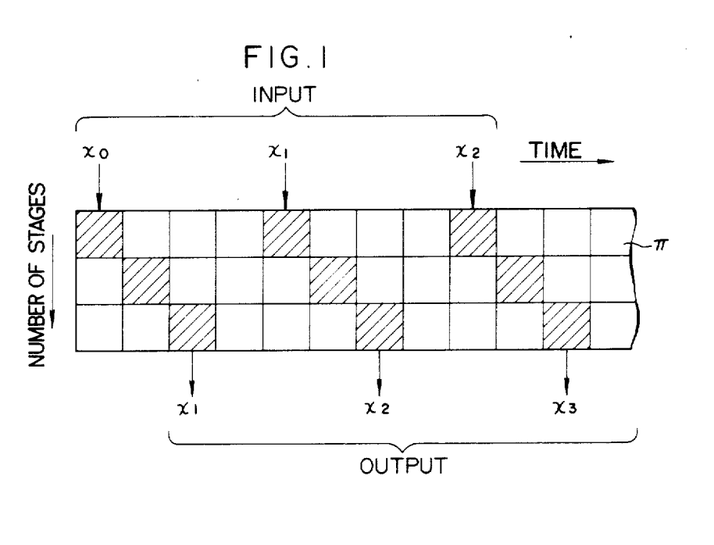
FIG. 1 is a diagram showing the portions in the $\pi$ space of the cyclic operation processes which are processed by a pipeline processor.

When the cyclic operation processes are executed using a vector processor having a plurality of stages, as shown in FIG. 1, in the space consisting of two factors of time and stage (hereinafter, this space is referred to as $\pi$), the portions (hatched portions in FIG. 1) where the effective operations are being performed are very few. Consequently, in the portions indicative of the invalid processes in the $\pi$ space, if the process of the function h due to the parallel processing method of the cyclic operation and the parallel processes of the cyclic operation are executed, the value of n can be limited by the invalid portions in the space $\pi$. However, the parallel processes of the cyclic operation can be performed without causing an increase in hardware.

DESCRIPTION OF THE PREFERRED EMBODIMENTS

Figure 2A:
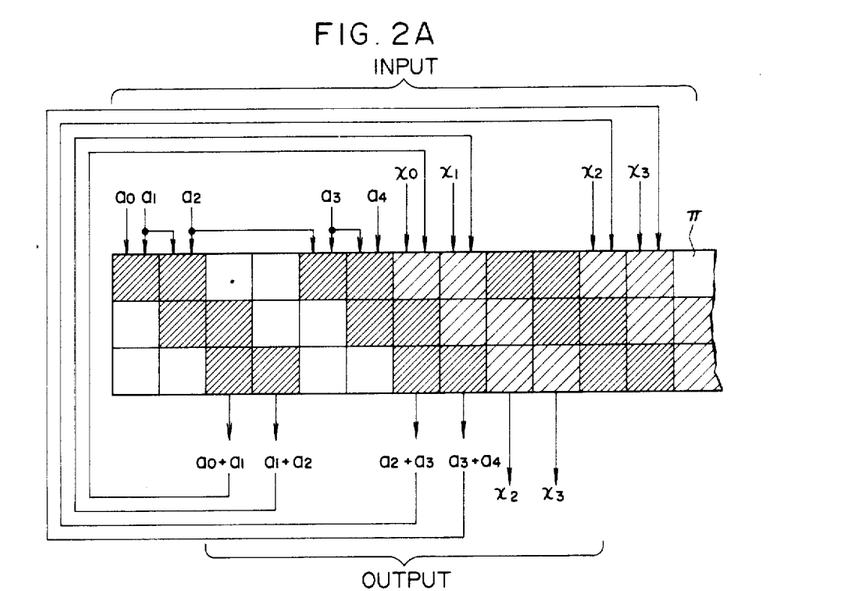
FIG. 2A is a diagram showing the portions in the $\pi$ space of the cyclic operation which are processed by the present invention.

The foregoing method will now be explained with respect to a practical example. The simplest cyclic operation $x_{i+1} = x_i + a_i$ is modified as follows $x_{i+1} = x_{i-1} + a_{i-1} + a_i.$ When this equation is used as a reference, the practical cyclic calculations will be as follows $$x_2 = x_0 + (a_0 + a_1)$$
$$x_3 = x_1 + (a_1 + a_2)$$
$$x_4 = x_2 + (a_2 + a_3)$$
.
.
.

where, $x_0$ and $x_1$ are given as initial values. In the case where these series of calculations are separated into the portion $(a_i + a_{i+i})$ and the portion $(x_{i+2} = x_{i+} \ldots)$ and are processed by a vector processor in which both operations are time-sharingly divided, the $\pi$ space will be as shown in FIG. 2A. As will be obvious from the comparison of FIGS. 1 and 2A, (1) the effective operating portions in the $\pi$ space in FIG. 2A are enlarged as compared to those in FIG. 1 due to the parallel processing method, so that (2) the speed at which the outputs are obtained is approximately doubled.

This remarkable effect to the cyclic operation is presented by time-sharingly dividing the operations of one processor without increasing the size of the vector processor.

Figure 3:
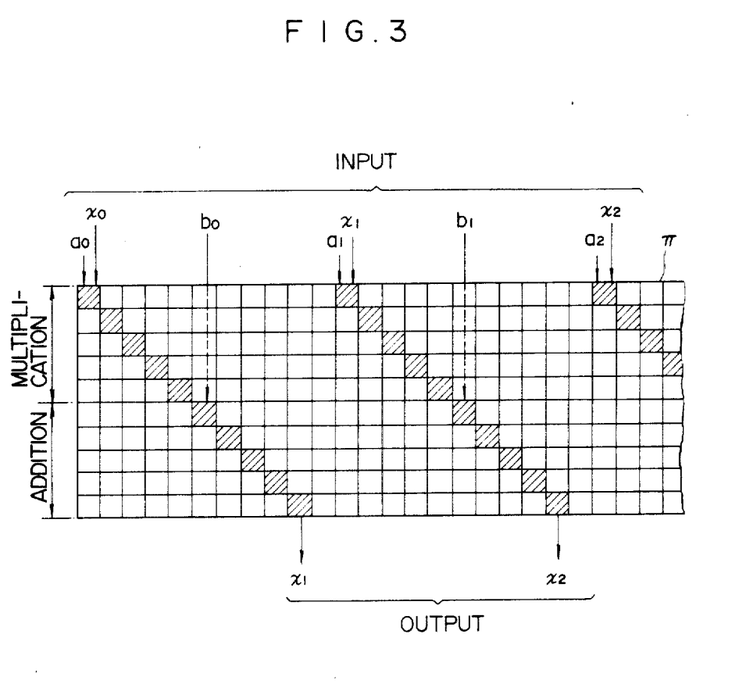
FIG. 3 is a process diagram for calculations in the $\pi$ space.

Next, an effect in the case where a plurality of vector processors are coupled in series will be described with respect to a practical example. To operate the following first order iteration $x_{i+1} = x_i * a_i + b_i \ (i=0, 1, 2, \ldots)$ due to the pipeline control method, a multiplier and an adder are coupled in series. When a $\pi$ space due to a conventional cyclic operating method is shown in the vector processor with such a hardware arrangement, it will be as shown in FIG. 3. In FIG. 3, a reference character b denotes data to be operated which is inputted to the adder coupled to the output side of the multiplier.

Figure 4:
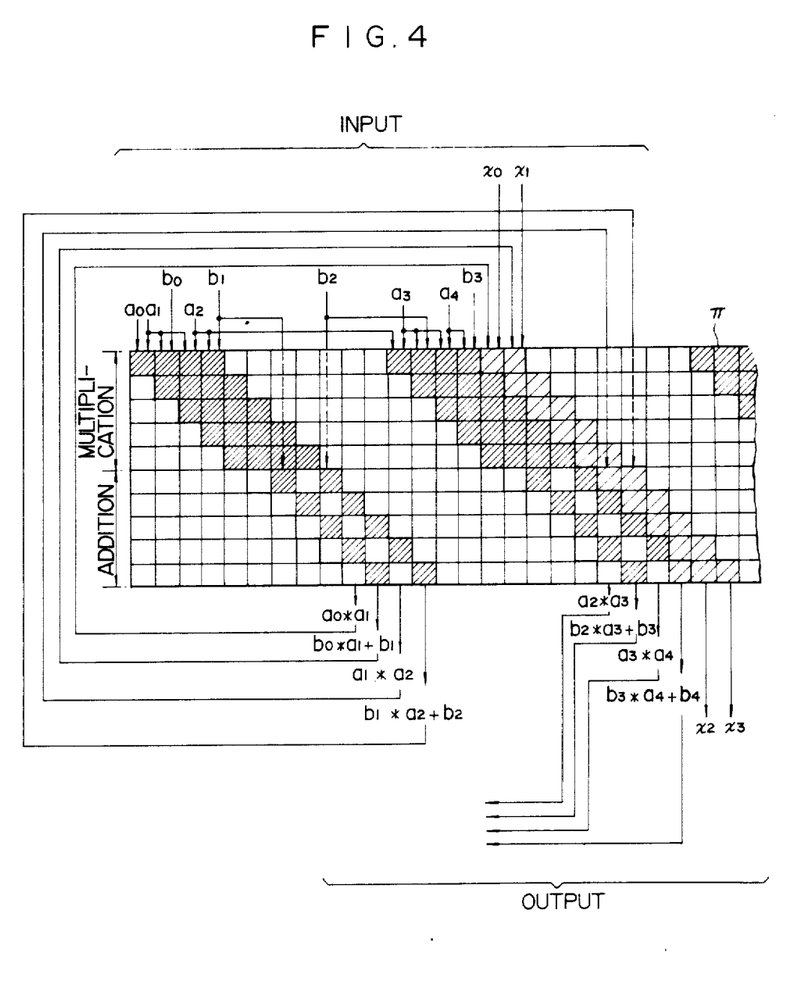
FIG. 4 is a diagram showing the state of the cyclic operation processes in the $\pi$ space according to the invention.

The above first order iteration is modified as follows, $x_{i+1} = x_{i-1} * (a_{i-1} * a_i) + (b_{i-1} * a_i + b_i)$ Therefore, we will have $x_2 = x_0 * (a_0 * a_1) + (b_0 * a_1 + b_1)$ $x_3 = x_1 * (a_1 * a_2) + (b_1 * a_2 + b_2)$ $x_4 = x_2 * (a_2 * a_3) + (b_2 * a_3 + b_3)$ $x_5 = x_3 * (a_3 * a_4) + (b_3 * a_4 + b_4)$ FIG. 4 is a diagram showing a $\pi$ space in case of processing these series of cyclic calculations by a vector processor of the type in which time-sharingly divided operations of the multiplier and adder are coupled.

As will be apparent from FIG. 4, even in case of the vector processor of the type in which pipeline processors are coupled in series, the processing speed of the cyclic operation can be improved by time-sharingly using this processor.

A practical example of operations will now be explained hereinbelow. When the operating processes in the case where the cyclic operation of the following format $x_{i+1} = x_i + a_i$ is modified to $x_{i+1} = x_{i-1} + (a_{i-1} + a_i)$ is shown with respect to input operands and outputs, it is as shown in FIG. 5.

Figure 5:
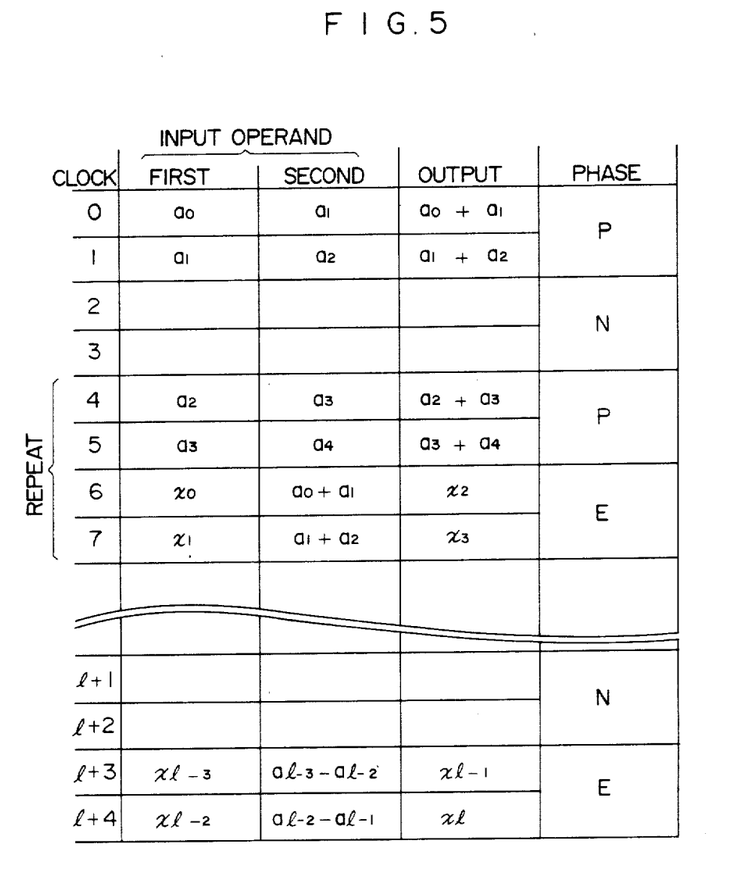
FIG. 5 is a diagram showing a correspondence table with the phase information which is produced by a controller of the processor.

In FIG. 5, the processes by the vector processor are sequentially performed in accordance with the clock number from the lower to the upper number. The processes by this vector processor (adder in case of this embodiment) can be classified into three kinds of P, N and E in dependence upon the nature of the process. In the N-phase among them, no process is actually executed. A variable l denotes the final element number of a vector x which is calculated. In FIG. 5, l is an odd number. When l is an even number, the procedure to calculate $x_{l-1}$ and $x_l$ in the last E-phase and the P-phase time for the input operand calculation for this procedure become one-half. Since the process diagram in the case where these end processes are performed is not directly concerned with the concept of the present invention, it is omitted.

Figure 6:
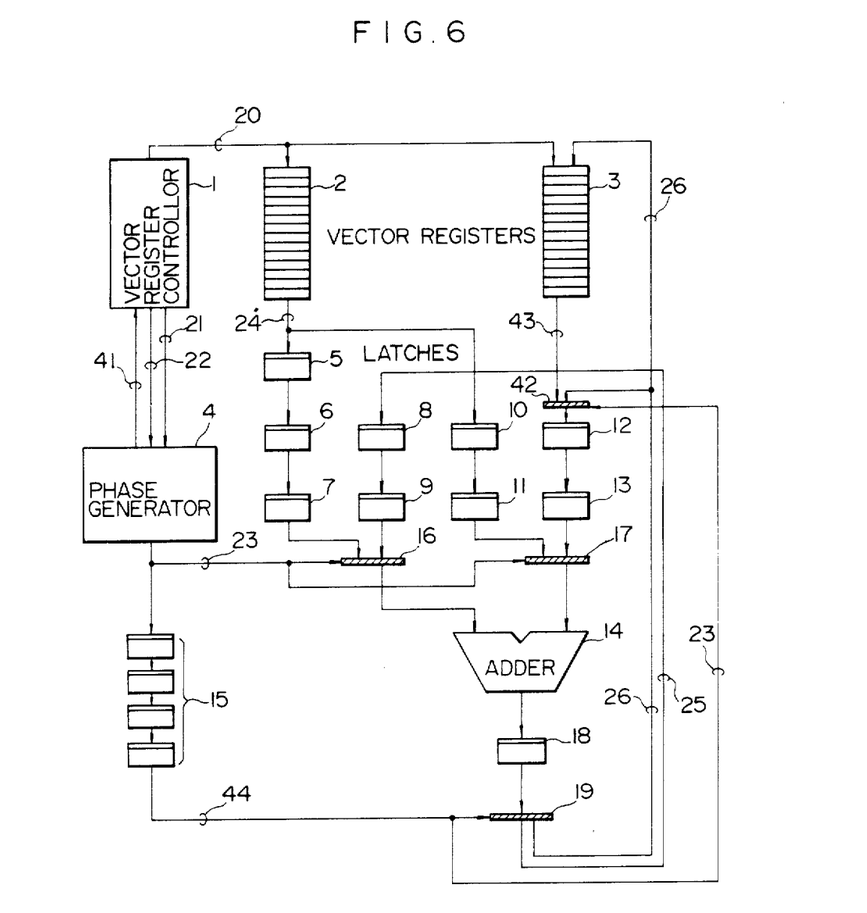
FIG. 6 is a block diagram showing a vector processor to implement the cyclic operation processes shown in FIG. 5.

An outline of a logic circuit diagram to carry out the operation in FIG. 5 is shown in FIG. 6.

In FIG. 6, a reference numeral 1 denotes a vector register controller for generating write and read addresses for accessing data in and from vector registers 2 and 3, in which data a and x to be operated on are stored, due to requests for these registers. It is now assumed that elements $x_0$ and $x_1$ have already been written in the vector register 3. A controller (hereinafter, referred to as a phase generator) 4 serves to define phases of the cyclic operation shown in FIG. 5. Data $\{a_i\}$ which should be operated on is held in latch circuits 5, 6, 7, 10, and 11. It is assumed that the data $\{a_i\}$ in this latch circuit is sent to the latch circuit at the next stage after the next data $\{a_{i+1}\}$ was sent from the vector register 2. A numeral 14 is an adder based on the pipeline control method, and 8 and 9 are latch circuits for storing the data $\{a_{i-1} + a_i\}$ calculated in the P-phase by the adder 14. The data in this latch circuit is also controlled so as to be automatically set into the latch circuit at the next stage after the next data $\{a_i + a_{i+1}\}$ was sent by the adder 14.

Latch circuits 12 and 13 store data $\{x_i\}$, which should be operated, of the adder 14. The data in this circuit is likewise controlled so as to be automatically shifted to the circuit at the next stage after one element of data $\{x_i\}$ was calculated by the adder 14. For such automatic setting operations into the latch circuit at the next stage, the data in the latch may be set into the latch circuit at the next stage using an enable signal indicative of validity of the data when the data is produced. A controller for this purpose is omitted in FIG. 6 for simplicity.

When a start instruction is inputted to the vector processor in FIG. 6, the vector register controller 1 transmits a signal indicative of the start of operation of the adder onto a bus 21. In response to this signal, the phase generator 4 produces a signal to instruct the P-phase in FIG. 5 and sends this signal to selectors 16 and 17 through a bus 23.

On the other hand, the vector register controller 1 transmits data $a_0, a_1, a_2, \ldots$ in the vector register 2 to the latch circuit group 5, 6, 7, 10, and 11 through a request bus 20 and a data bus 24 in such a manner as to coincide with the timing when the phase generator 4 produces the P-phase signal and sends this signal to the selectors 16 and 17. As will be obvious from FIG. 6, when $a_0$ is set in the latch 7, a is simultaneously set in the latch 11. In the P-phase, the selectors 16 and 17 respectively select the outputs of the latches 7 and 11, thereby allowing the results to be sent to the adder 14. In the adder 14, the transmitted data is sequentially converted and the result of addition is derived in a latch 18 after a predetermined timing.

The phase signal produced by the phase generator 4 is transmitted through a delay latch group 15 including the delay latches equal in number to the number of stages of the adder 14. The signal indicative of the P-phase is sent to a switching circuit 19 so as to coincide with the timing when the foregoing result of operation $(a_0+a_1)$ is obtained in the latch 18. The switching circuit 19 selects a bus 25 in case of the P-phase, so that the result of addition $(a_0+a_1)$ is set into the latch 8. Similarly, at the next timing, $(a_1+a_2)$ is set in the latch 8 and $(a_0+a_1)$ is set in the latch 9.

Figure 2B:
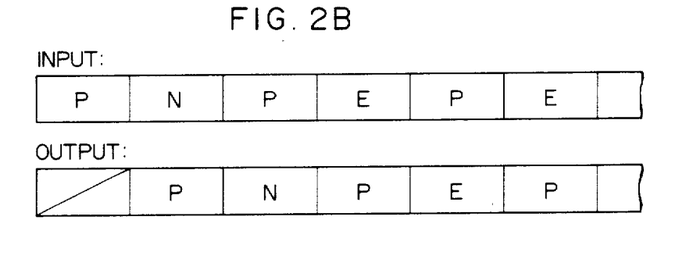
FIG. 2B is a diagram showing the phase relation between the input and output times of the $\pi$ space of the phases which is produced by a time-sharing circuit of a processor according to the present invention.

Next, the phase generator 4 switches the phase and sends an N-phase signal onto the bus 23. In the N-phase, both selectors 16 and 17 and switching circuit 19 do not perform the connections among the buses so as to select the significant data. Therefore, the data in the latches 7 and 11 are held as they are. On the other hand, in the N-phase, a selector 42 is made operative in response to an output signal (on a bus 44) of the delay latch group 15, thereby connecting an output bus 43 of the vector register 3 with the data bus of the latch 12. Due to this operation, the initial values $x_0$ and $x_1$ of the vector x are set into the latches 12 and 13. At this set timing, the phase generator 4 has produced the P-phase signal and the selector 17 has coupled the bus between the latch 11 and the adder 14. At this timing, $a_2$ has been stored in the latch 7 and $a_3$ has been stored in the latch 11, then the adder 14 performs the processes of $(a_2+a_3)$ and $(a_3+a_4)$ in this second P-phase. At the timing when the output of the adder 14 was stored in the latch 18, the phase generator 4 had produced an E-phase. Thus, the selectors 16 and 17 are made operative and the latch circuits 9 and 13 are selected, thereby sending their outputs to the adder 14. When the values of the outputs, namely, $x_2$ and $x_3$ of the adder 14 are produced, the switching circuit 19 and selector 42 select a bus 26; therefore, the $x_2$ and $x_3$ are sequentially set into the latch circuits 12 and 13. When the $x_2$ and $x_3$ are set in the latch circuits 12 and 13, the selector 17 has selected the output of the latch circuit 11 in response to the P-phase signal (refer to FIG. 2B) and has completely connected the bus so that the data to be operated in the next P-phase can be sent to the adder 14.

On the other hand, the $x_2$ and $x_3$ calculated in the E-phase are written into the vector register 3 through the bus 26 in accordance with the address values produced by the vector register controller 1.

The cyclic operation is executed by repeating the operations in the P- and E-phase mentioned above.

Figure 7:
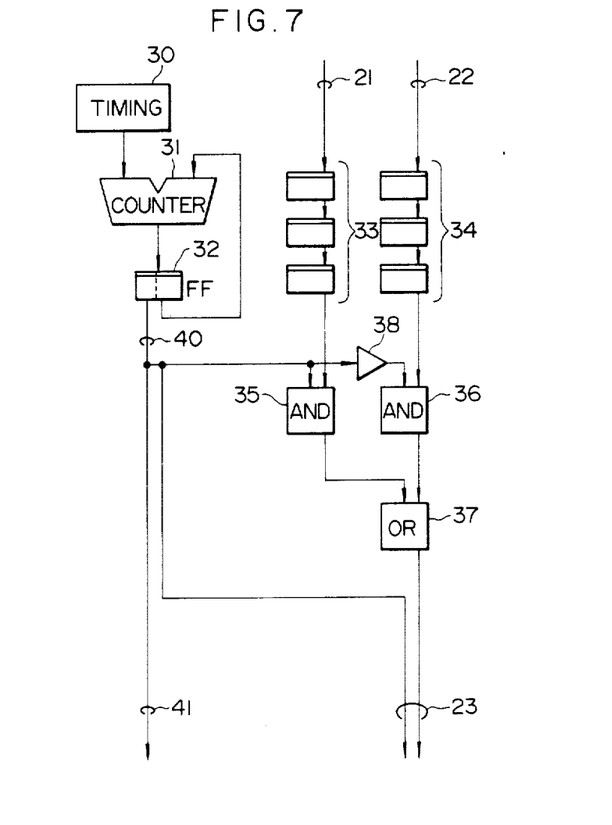
FIG. 7 is a block diagram showing a phase generator shown in FIG. 6.

FIG. 7 shows a schematic diagram of the phase generator 4. In this diagram, the same parts and components as those shown in FIG. 6 are designated by the same reference numerals. In FIG. 7, a reference numeral 30 denotes a timing generator; 31 is a cyclic counter of two bits; 32 a flip flop of two bits; 33 and 34 latch groups for delay so as to allow the phase generator 4 to receive at proper timings the start signal and an end of data transmission signal from the vector register controller 1; 35 and 36 AND circuits; 37 an OR circuit; and 38 an inverter. When the phase generator 4 is actuated, the counter 31 is reset to "11".

The signal on the bus 23 is defined such that: "00" is the P-phase; "11" is the N-phase, "10" is the E-phase; and "01" is a meaningless signal. When the phase generator 4 is actuated and a timing pulse is sent to the counter 31, the counter value changes from "00" to "01"→"10"→"11"→... This value is immediately set into the flip flop 32. A bus 40 is connected to an output terminal of 0 bit (hereinbelow, referred to as a higher significant bit) of the flip flop 32. Therefore, the higher significant bit of the bus 23 becomes "0" for the internal of two clocks from the start time. At this time, the end signal from the vector register controller 1 is not transmitted onto a bus 22, so that the output of the AND circuit 36 becomes "0" and the output of the OR circuit 37 also becomes "0". Namely, a lower significant bit on the bus 23 becomes "0", thereby producing a signal indicative of the P-phase.

After three clocks, the higher significant bit of the output of the counter 31 becomes "1". On the other hand, the "start signal" transmitted from the vector register controller 1 onto the bus 21 passes through the delay latch group 33 and is inputted to the AND circuit 35 so as to coincide with the timing when three clocks are generated. Thus, the lower significant bit on the bus 23 becomes "1", thereby producing a signal representative of the N-phase together with the higher significant bit. It is assumed that the "start signal" is transmitted from the vector register controller 1 during the interval of two clocks. In case of making the start signal effective for one clock, another logic circuit is needed in the phase generator 4 in order to hold the "start signal" for further one clock using the output of the counter 31. Since this logic circuit is not directly concerned with the essence of the present invention, this logic circuit is omitted from FIG. 7 for simplicity of explanation. Similarly, it is assumed that the "end signal" which is sent from the vector register controller 1 onto the bus 22 is transmitted for two clocks in the following description.

After the N-phase was produced, the phase generator 4 sequentially produces the P-phase, E-phase, ... and transmits these information onto the bus 23.

It is necessary to make the timings coincident with respect to the data transmission and reception between the vector register controller 1 and phase generator 4 so that the counter 31 enters the P-phase mode when the vector register controller 1 transmits the "end signal". For this purpose, a phase change-over signal is transmitted onto a bus 41. The vector register controller 1 can know the processing situation of the data due to the phase change-over signal, thereby enabling the "end signal" to be transmitted through the bus 22 at a suitable timing at which the phase generator 4 can receive the "end signal" prior to sending the last data. In response to the "end signal" produced in this way, the process for changing the P-phase to the N-phase at the last stage of the cyclic operating processes can be executed by the combination of the inverter 38 and AND circuit 36 in FIG. 7.

The selector 42 (FIG. 6) selects the bus 43 in response to the N-phase signal which is produced at the time of the end process. At this time, although the data on the bus 43 is not guaranteed, the result of this last N-phase is not used for the next operation, so that the operations of the vector processor of the present invention is guaranteed.

Figure 8:
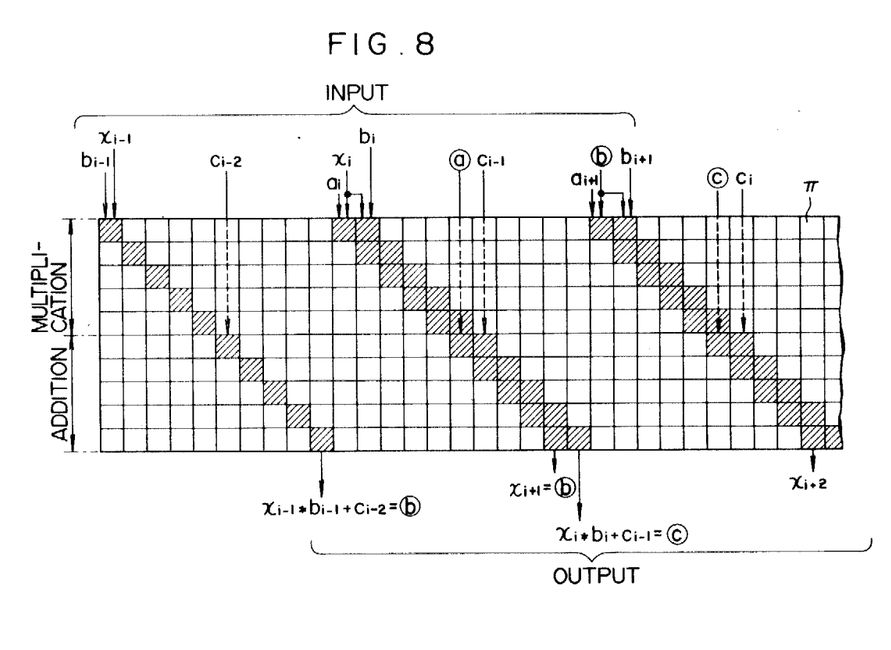
FIG. 8 is a process diagram for the higher order cyclic operation in the $\pi$ space according to the invention.

According to the present invention, the preparation for the cyclic operation and the cyclic operation itself can be performed by the same pipeline processor; therefore, there is an effect such that the cyclic operation can be processed at a high speed due to the time-sharing processes of the processor without causing a remarkable increase in hardware. On the other hand, the cyclic operation such as $$x_{i+1} = x_i \cdot a_i + x_{i-1} \cdot b_{i-1} + c_{i-2}$$

which could not be realized so far can be also realized by the hardware with an arrangement in which the pipeline multiplier and adder are coupled in series. FIG. 8 is a diagram showing a $\pi$ space when the above operation is processed.

We claim:

1. A vector processor comprising:
    a plurality of vector registers for storing vector elements of respective vectors;
    an arithmetic logic unit for carrying out an operation between vector elements successively read out from said vector registers and for writing results of said operation between vector elements successively into one of said vector register; and
    control means for pipeline-controlling said arithmetic logic unit so that said operation performed thereby is divided into a plurality of stages and said vector elements for said plurality of stages are processed in parallel thereby performing an iterative operation between first vector data elements ($x_i$) and second vector data elements ($a_i$), where the first vector data elements ($x_i$) form a last operation result of said operation and the second vector data elements ($a_i$) are mutually independent from element to element; said control means including:
    (1) first latch means for holding the first vector data elements read from a vector register or supplied from said arithmetic logic unit;
    (2) second latch means for holding at least two succeeding vector data elements ($a_{i-1}$) and ($a_i$) of the second vector data elements read from said vector register;
    (3) third latch means for holding the output of said arithmetic logic unit based on the operation on said second data elements ($a_{i-1}$) and ($a_i$) held in said second latch means;
    (4) selection means for selecting vector data held in said first, second and third latch means and for supplying the selected data to said arithmetic logic unit; and
    (5) phase generating means for generating a phase signal which controls said selection means to select (a) the vector data elements ($a_{i-1}$) and ($a_i$) of said second latch means or (b) the vector data elements of said first and third latch means on a time-sharing basis and to supply them to said arithmetic logic unit.

2. A vector processor according to claim 1, further comprising:
    delay means for delaying said phase signal by a timing equal to the number of stages of said arithmetic logic unit; and
    selection means for controlling the output of said arithmetic logic unit to be supplied to either one of said first and third latch means based on the output of said delay means.

* * * * *

UNITED STATES PATENT AND TRADEMARK OFFICE
CERTIFICATE OF CORRECTION

PATENT NO. : 4,757,444

DATED : July 12, 1988

INVENTOR(S) : Tomoo Aoyama et al.

It is certified that error appears in the above-identified patent and that said Letters Patent is hereby corrected as shown below:

On the title page, Item [73] should read

-- [73] Assignees: Hitachi, Ltd., Tokyo and
Hitachi Computer Engineering Co., Ltd.,
Kanagawa-Ken, Japan --.

Signed and Sealed this

Eighteenth Day of July, 1989

*Attest:*

DONALD J. QUIGG

*Attesting Officer*   *Commissioner of Patents and Trademarks*